Aug. 6, 1940.                L. GALINDO                2,210,451
                            VEHICLE WHEEL
                          Filed June 16, 1937

L. Galindo
INVENTOR

By Glascock Downing & Seebold
ATTYS.

Patented Aug. 6, 1940

2,210,451

UNITED STATES PATENT OFFICE 2,210,451

VEHICLE WHEEL

Luis Galindo, Santiago, Chile

Application June 16, 1937, Serial No. 148,597

1 Claim. (Cl. 301—39)

The present invention has reference generally to improvements in vehicle wheels and more particularly pertains to a wheel of the type described in my Patent No. 1,988,352.

It has been found that on high speed cars the tire disclosed in the above mentioned patent should be used without the inner tread member, and an easy way should be found to improve the changing operation of a punctured tire. Therefore, the present invention relates to an improved wheel which enables the tire to be attached easily, and used on high speed cars without the inner tread member.

Other objects as well as the nature, characteristic features and scope of the invention will be more readily apparent from the following description taken in connection with the accompanying drawing and pointed out in the claim.

The invention is clearly illustrated in the accompanying drawing, in which.

Similar characters of reference are employed in all of the above described views, to indicate corresponding parts.

Figure 2:
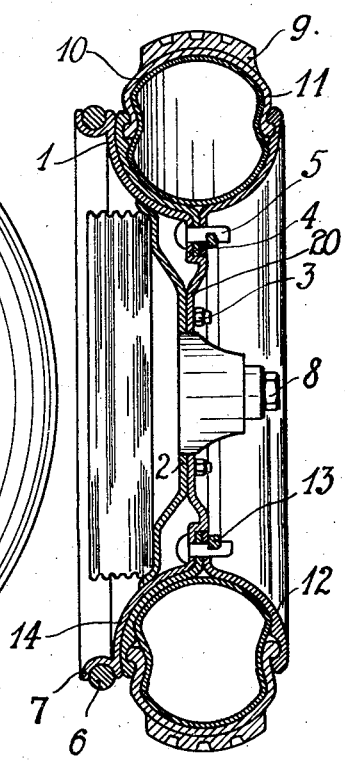
Fig. 2 is a transverse sectional view through a complete wheel particularly showing the construction of the improved tire.

Referring to the accompanying drawing and particularly to Fig. 2 there is provided a metal disc-like member 20 having a lateral arcuate extension 1 which forms an auxiliary rim for the wheel. The disc-like member 20 is reinforced by means of a diaphragm 2 which is secured to the hub portion of the disc-like member by means of bolts 3. The auxiliary rim 1 and the peripheral edge of the diaphragm 2 are welded together and they represent the fixed part of the wheel. The metallic auxiliary rim 1 on which the tire can be placed, is shaped as shown in Fig. 2 and the metallic ring piece 14 or the rim portion 14 of the tire itself fits the arcuate shape of the auxiliary rim 1 and the inner edge of the rim portion 14 rests on the shoulder 4. Inward movement of the detachable tire is limited by the flat surface of the disc-like member 20 adjacent the shoulder 4. Through the annular flat surface adjacent to shoulder 4 pass the specially designed coupling pins 5, their head being welded to the part 1.

Figure 1:
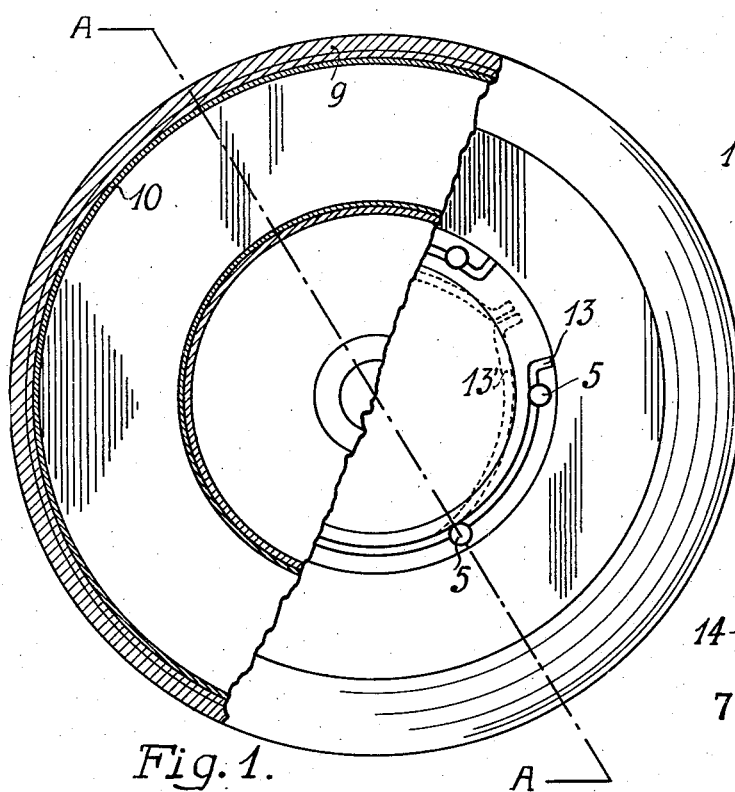
Fig. 1 is a side elevational view of the improved device partly broken away to illustrate a portion of the wheel and tire in circumferential section.
Figure 3:
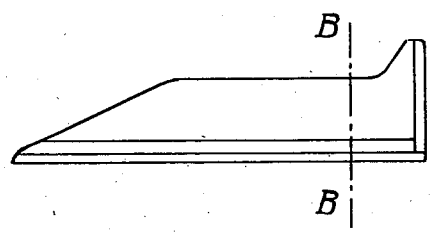
Fig. 3 shows a new type of lifting wedge, to be used in case a tire or wheel should be quickly replaced.

The part 1 is shaped so as to provide an annular grooved ringholder 7 to receive a rubber ring 6 which is adapted to protect the metal parts of the wheel by carrying the weight of the vehicle over rough pavement in case the tire tube has been punctured or deflated. The ringholder 7 is also useful to avoid any accident which may be caused by a loss of control of the machine if a tire has been punctured at high speed. In this case, the car wheel radius is reduced only 2 or 3 inches and the direction control can easily be maintained. It also permits the car to be moved at a moderate speed, leaning on this auxiliary tire 6, and finally, the ringholder 7 is useful to lift the car in case of a deflated tire, by means of a single wedge piece shown on Fig. 3. This wedge piece can easily be placed in front of ringholder 7, so that the rubber ring 6 can run along the inclination of the upper surface and lift the car enough to be able to replace a punctured tire. Once the car wheel on which the tire has to be replaced, reaches the horizontal wedge surface, the car must be braked. The changing procedure of the tire itself, after taking off the wheel cover, consists only in pressing with both hands the ends of the steel ring 13 (see Fig. 1), which fits in corresponding grooves provided at the inner side of each coupling pin 5. By the application of such pressure, the diameter of the steel ring 13 is made smaller, and it can be disengaged from the pins 5. After such operation, the deflated tire can be replaced by a new one.

The tire is constituted by two metal rim portions 12 and 14. The rim portion 14 is arranged with its outer surface against the rim 1. As shown in Fig. 2, the peripheral portions of the rims 12 and 14 are inwardly curved in opposite directions to provide circumferential seats for the marginal portions 11 of the tread member 9. As already known, the marginal portions 11 are usually reinforced by steel strips or wire and this enables a better fastening of the tread member inside the rim portions 12 and 14. The air pressure of the inner tube 10 also helps to secure the tread member between the rim portions 12 and 14.

Having thus fully described the invention, what is claimed as new and desired to be secured by Letters Patent is:

In a vehicle wheel, a disc-like hub member having an integral annular arcuate shaped lateral peripheral extension providing an auxiliary rim portion for the wheel, an annular shoulder formed on the disc-like member by an offset part of the disc-like member, a rigid arcuate shaped annular rim portion shaped to fit within said auxiliary rim portion, said rim portion having an integral inwardly directed flange with the inner edge thereof resting on said shoulder, another rigid oppositely curved annular rim portion having an integral inwardly projecting flange with the inner edge thereof resting on said shoulder, and means for detachably securing said rim portions to the disc-like member.

LUIS GALINDO.